April 21, 1964 C. I. LITTLE 3,130,247
CARBURETOR CONTROL VALVES
Filed Aug. 7, 1961 2 Sheets-Sheet 1
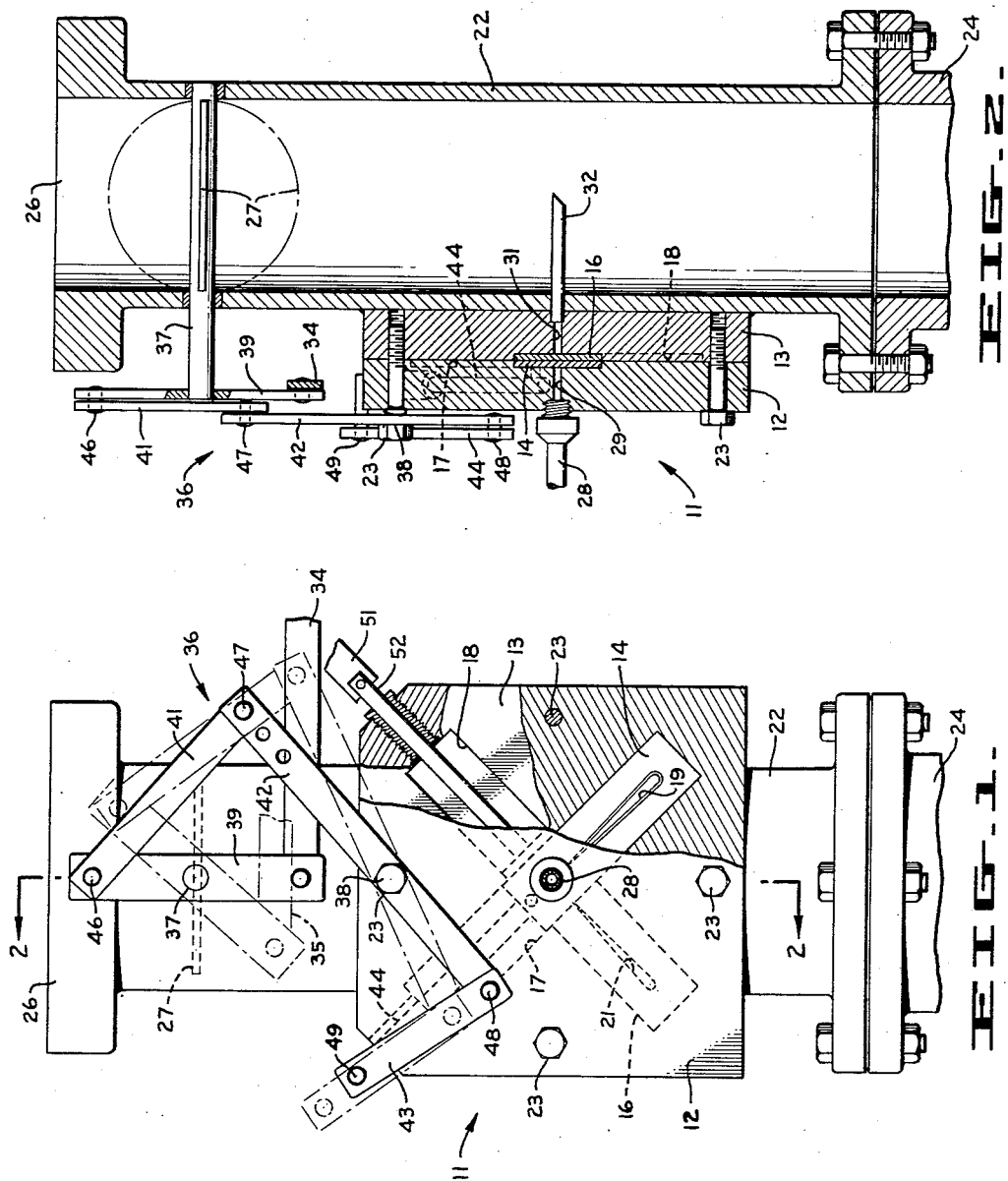
INVENTOR.
CLIFFORD I. LITTLE
BY
*Schapp & Hatch*
ATTORNEYS

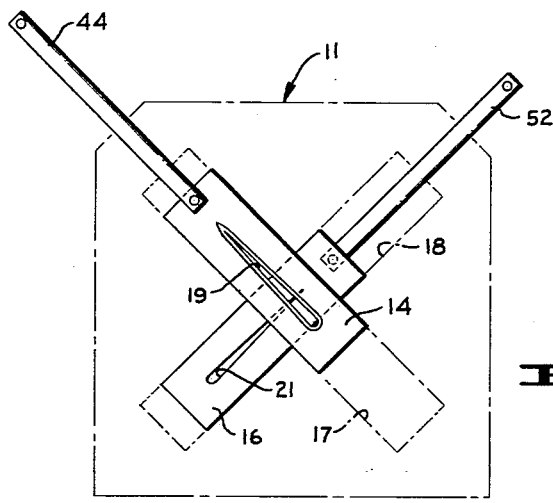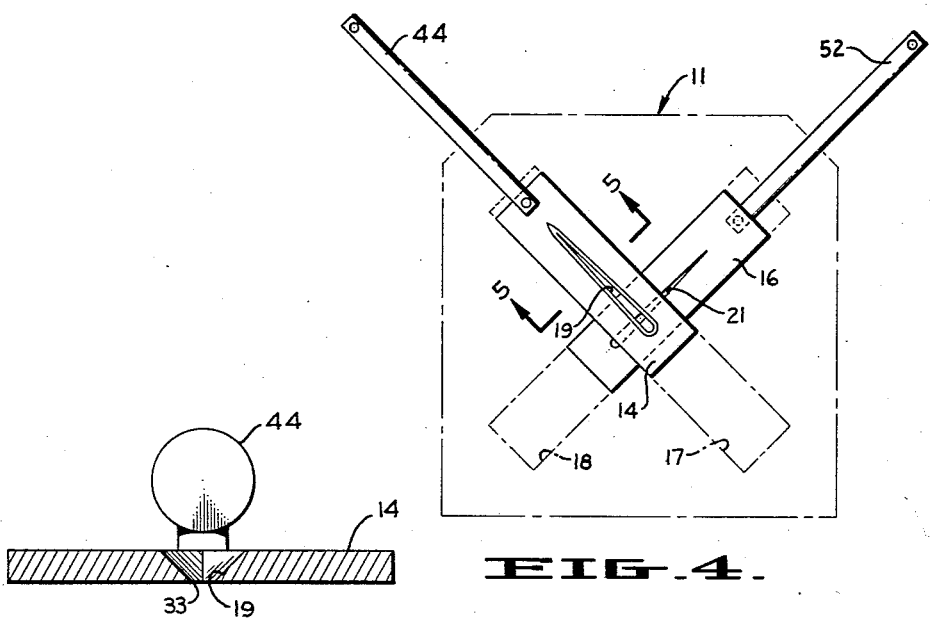

United States Patent Office 3,130,247
Patented Apr. 21, 1964

3,130,247
CARBURETOR CONTROL VALVES
Clifford I. Little, 2607 8th Ave., Oakland, Calif.
Filed Aug. 7, 1961, Ser. No. 129,628
12 Claims. (Cl. 251—50)

The present invention relates to improvements in a valve and more particularly to a valve which is responsive to a plurality of controls.

Generally speaking, prior valve mechanisms which had to be set according to a plurality of criteria, had one variable on the valve and needed additional means to translate a plurality of different requirements into a single setting. This translation was accomplished either by the addition of other parts suitable for the particular use or by computation and adjustment by the operator. Accordingly, operations tended to become complicated particularly where automatic mechanisms were utilized.

An improvement over these systems is now provided by the present invention in which a plurality of mechanical elements are independently responsive to a plurality of different variables and act to directly yet independently adjust the valve opening.

As used herein, the term "valve" is intended to include not only a device having a regulated opening for controlling the passage of fluids but also a device having a regulated opening for controlling the passage of substances in general. Thus, in its broad aspect, the valve of this invention includes apertures for controlling radiation or the like. For example, it includes control of light in front of a light-sensitive film such as those used in photography or the control of other radiation such as X-rays or gamma rays.

Although the valve of this invention has a wide variety of applications, it will usually be used to control fluids such as may be used in chemical processes where a plurality of variables must be controlled to achieve optimum operation. The valve of this invention is particularly valuable when two independent variables or sets of conditions are to be controlled. However it will be appreciated that the valve of this invention may be used in combination with other means for adjusting a valve to provide a valve responsive to more than two variables.

One embodiment of the valve of this invention has been developed for controlling the gasoline fed through a carburetor and this use will be discussed fully as an example of the operation of the valve of this invention. With this example at hand, other applications will be apparent and need not be discussed in detail.

From the foregoing, it is seen that a primary object of this invention is to provide a valve mechanically responsive to two sets of criteria which is simply constructed and accurate in operation.

Another object of the invention is to provide a valve which is self-cleaning and capable of long service with a minimum of wear of the moving parts.

A further object of this invention is to provide a valve of the character described capable of receiving a plurality of motions from sensing devices and automatically adjusting the valve to compensate for the changes received.

These and further objects which will become apparent as the specification proceeds are obtained by a valve structure which comprises a body, a first valve plate mounted for linear movement on the body, walls defining a substantially V-shaped opening in the first valve plate positioned to move with linear movement of the plate in the direction of the axis extending through the apex of the V, a second valve plate mounted on the body for linear movement in a direction substantially perpendicular to the movement of the first plate, and walls defining a substantially V-shaped opening in the second valve plate positioned to move with linear movement of the second plate in the direction of the axis extending through the apex of the V, said plates being positioned so that the opening in one plate is in alignment with the opening in the other plate.

The preferred form of my invention is illustrated in the accompanying drawings forming part of this application in which:

FIGURE 1 is a front elevational view partly broken away illustrating the valve of this invention in combination with a carburetor;

FIGURE 2, a cross-sectional view of the valve of this invention in place on a carburetor taken substantially on the plane of line 2—2 of FIGURE 1;

FIGURE 3, an elevational view of the operating parts of the valve illustrating in greater detail the mode of operation thereof;

FIGURE 4, a view similar to that of FIGURE 3 showing the operating parts of the valve in an alternative position; and FIGURE 5, a cross-sectional view taken substantially on the plane of line 5—5 of FIGURE 4.

While I have shown only the preferred form of my invention, it should be understood that various changes or modifications may be made within the scope of the claims attached hereto without departing from the spirit of the invention.

Referring to the drawing in detail, it is seen that my valve comprises basically a body 11 consisting of a pair of members 12 and 13 which hold valve plates 14 and 16 in slots 17 and 18 and which allow linear movement of plates 14 and 16 in directions substantially perpendicular to each other. Plates 14 and 16 contain V-shaped openings 19 and 21, respectively, which are positioned to slide over each other so that the opening in one plate may be aligned with the opening in the other thereby regulating the opening through both plates as will be more fully explained below.

The valve is mounted in operative position on an air intake throat 22 of a carburetor by means of bolts 23 which also hold members 12 and 13 and plates 14 and 16 in place. The air intake throat communicates with opening 24 of an engine intake manifold at one end and to an air intake opening 26 at the other end. Regulation of air is achieved by operation of butterfly valve 27 which is mounted in the air intake throat 22 as best shown in FIGURE 2.

Gasoline is brought into the air intake throat 22 through fuel line 28, hole 29 in member 12, opening 19 of plate 14, opening 21 of plate 16, hole 31 of member 13 and into injection tube 32 as best shown in FIGURE 2. The gasoline is metered by adjusting the aligned portion of the V-shaped openings 19 and 21.

As best seen in FIGURES 1, 3 and 4, the aligned portion of openings 19 and 21 is adjusted by linear movement of either plate so that the influence of one plate is independent from the other in its effect on the size of the aligned opening. For example, in FIGURE 3 the plate 14 is in an open position and therefore presents a rather wide portion of its V-opening 19 adjacent to the V-opening 21 of plate 16; however plate 16 is in a comparatively closed position so that the aligned portion of its V is somewhat narrow. This provides a relatively small opening for gasoline to pass through. The opening is increased as the position of each plate is changed from that of FIGURE 3 to that of FIGURE 4. Thus the width of V-opening 21 is increased considerably as plate 16 is moved from a comparatively closed position to a comparatively open position. At the same time, the entire opening is also increased somewhat by the slight movement of plate 14 to an even more open position which in turn increases the width of V-opening 19 in alignment with V-opening 21.

From the above discussion, it is apparent that the aligned V-openings define a quadrilateral which differs from a rectangle by the angle of the V's. Thus the smaller the angles the closer the aligned openings approach a rectangular configuration. From the above discussion, it is also seen that the control of each V-opening adjusts the spacing of two opposite sides of the quadrilateral. Accordingly, the controls operate independently of each other and each change in the opening is in a direct relation to the linear positioning of each V with the final opening being determined by the positions of both controls. As indicated above, the angle of the legs of the V influences the operation of the valve with small angles providing more accurate adjustments and more proportionate response to the movement of a particular V-opening. On the other hand, when the legs of the V define too small an angle, the range of adjustment is likely to be too small. Generally, the angle will be from say 0.1 to 30 degrees although angles outside this range are still operative and might be used in special cases. More often, the angle will be between about 1.0 and 10 degrees and the angle used for the carburetor specifically described is about 3.2 degrees. The angles may be the same or different depending upon the use contemplated for the valve.

As best shown in FIGURE 5, the V-openings are tapered or beveled to provide a sharp knife edge 33. The angle of bevel is not critical and the 45 degree angle shown in FIGURE 5 is considered practical. Both V-openings are beveled and the knife edges are placed in side-by-side relation. This arrangement provides a self-cleaning action which is important with certain types of operations where valves tend to get fouled and need to be cleaned frequently. In addition, this self-cleaning action is valuable in retaining the opening at the controlled value. For this reason, self-cleaning is valuable in a carburetor where small deviations from that desired have considerable influence on the operation of the engine utilizing the carburetor.

Referring again more particularly to FIGURES 1 and 2, the operation of the carburetor will be further described to illustrate how the valve of this invention is responsive to two sets of conditions. As accelerator lever 34 is moved from the position shown in solid lines to that shown in phantom at 35, linkage 36 moves on pivots 37 and 38 to rotate butterfly 27 to an open position and simultaneously move plate 14 and thereby open the valve by registering a larger opening of V-opening 19 in alignment with gasoline feed line 28. Movement of plate 14 and butterfly 27 by linkage is effected through arms 39, 41, 42, 44 and associated pivotal connections 46, 47, 48 and 49 with these parts moving from the position shown in solid lines to that shown in phantom in FIGURE 1.

These movements provide a controlled relationship between the amount of air and the amount of gasoline fed to the engine. However, it is seen that the ratio of air to gasoline not only depends on the relative position of the valve openings, but that it is also affected by the pressure of the feed systems. Although the pressure of the gasoline can be held sufficiently constant for good operation, changes in atmospheric pressure will affect the amount of air passing through the butterfly at any given position. Other factors also provide influences that should be adjusted such as temperature or vacuum mixture control. This set of conditions is adjusted by movement of arm 51 and rod 52 which in turn adjusts the position of plate 16 and V-shaped opening 21. Responses to atmospheric pressure can be transmitted to the arm 51 and opening 21 by any means known for accomplishing such a result and the adjustment is thus rendered automatic, manual or both.

I claim:

1. A valve structure comprising a body, a first valve plate mounted for linear movement on the body, walls defining an elongated substantially V-shaped opening in the first valve plate positioned to move with linear movement of the plate in the direction of the axis extending through the apex of the V, a second valve plate mounted on the body for linear movement in a direction substantially perpendicular to the movement of the first plate, and walls defining an elongated substantially V-shaped opening in the second valve plate positioned to move with linear movement of the second plate in the direction of the axis extending through the apex of the V, said plates being positioned so that the opening in one plate is in alignment with the opening in the other plate.

2. A valve structure having mechanical controls responsive to two sets of conditions comprising a body, a first control means, a first valve plate mounted on the body for linear movement responsive to said first control means, walls defining a substantially V-shaped opening in the first valve plate positioned to move with linear movement of the plate in the direction of the axis extending through the apex of the V, a second control means, a second valve plate mounted on the body for linear movement in a direction substantially perpendicular to the movement of the first plate responsive to said second control means, and walls defining a substantially V-shaped opening in the second valve plate positioned to move with linear movement of the second plate in the direction of the axis extending through the apex of the V, said plates being positioned so that the opening in one plate is in alignment with the opening in the other plate.

3. A valve structure comprising a body, a first valve plate mounted for linear movement on the body, walls defining an elongated substantially V-shaped opening in the first valve plate positioned to move with linear movement of the plate in the direction of the axis extending through the apex of the V, a second valve plate mounted on the body for linear movement in a direction substantially perpendicular to the movement of the first plate, walls defining an elongated substantially V-shaped opening in the second valve plate positioned to move with linear movement of the second plate in the direction of the axis extending through the apex of the V, and the sides of each of said V's forming an angle of between about 0.1 and 30 degrees, said plates being positioned so that the opening in one plate is in alignment with the opening in the other plate.

4. A valve structure having mechanical controls responsive to two independent variables comprising a body, a first control means, a first valve plate mounted on the body for linear movement responsive to said first control means, walls defining a substantially V-shaped opening in the first valve plate positioned to move with linear movement of the plate in the direction of the axis extending through the apex of the V, a second control means, a second valve plate mounted on the body for linear movement in a direction substantially perpendicular to the movement of the first plate responsive to said second control means, walls defining a substantially V-shaped opening in the second valve plate positioned to move with linear movement of the second plate in the direction of the axis extending through the apex of the V, and the sides of each of said V's forming an angle of between about 0.1 and 30 degrees, said plates being positioned so that the opening in one plate is in alignment with the opening in the other plate.

5. A valve structure comprising a body, a first valve plate mounted for linear movement on the body, walls defining an elongated substantially V-shaped opening in the first valve plate positioned to move with linear movement of the plate in the direction of the axis extending through the apex of the V, said walls being beveled at an acute angle to provide a sharp edge on a surface of the plate, a second valve plate mounted on the body for linear movement in a direction substantially perpendicular to the movement of the first plate, and walls defining an elongated substantially V-shaped opening in the second valve plate positioned to move with linear movement of the second plate in the direction of the axis extending through the apex of the V, said walls being beveled to provide a sharp edge on a surface of the plate, said plates being positioned so that the opening in one plate is in alignment with the opening in the other plate and having the surfaces containing the sharp edges in contact with each other.

6. A valve structure having mechanical controls responsive to two sets of conditions comprising a body, a first control means, a first valve plate mounted on the body for linear movement responsive to said first control means, walls defining a substantially V-shaped opening in the first valve plate positioned to move with linear movement of the plate in the direction of the axis extending through the apex of the V, said walls being beveled to provide a sharp edge on a surface of the plate, a second control means, a second valve plate mounted on the body for linear movement in a direction substantially perpendicular to the movement of the first plate responsive to said second control means, and walls defining a substantially V-shaped opening in the second valve plate positioned to move with linear movement of the second plate in the direction of the axis extending through the apex of the V, said walls being beveled to provide a sharp edge on a surface of the plate, said plates being positioned so that the opening in one plate is in alignment with the opening in the other plate.

7. A valve structure having mechanical controls responsive to two independent variables comprising a body, a first control means, a first valve plate mounted on the body for linear movement responsive to said first control means, walls defining a substantially V-shaped opening in the first valve plate positioned to move with linear movement of the plate in the direction of the axis extending through the apex of the V, said walls being beveled to provide a sharp edge on a surface of the plate, a second control means, a second valve plate mounted on the body for linear movement in a direction substantially perpendicular to the movement of the first plate responsive to said second control means, walls defining a substantially V-shaped opening in the second valve plate positioned to move with linear movement of the second plate in the direction of the axis extending through the apex of the V, said walls being beveled to provide a sharp edge on a surface of the plate, and the sides of each of said V's forming an angle of between about 0.1 and 30 degrees, said plates being positioned so that the opening in one plate is in alignment with the opening in the other plate.

8. In a carburetor, in combination a valve comprising a body, a first valve plate mounted on the body for linear movement responsive to a first control means, walls defining an elongated substantially V-shaped opening in the first valve plate positioned to move with linear movement of the plate in the direction of the axis extending through the apex of the V, a second valve plate mounted on the body for linear movement in a direction substantially perpendicular to the movement of the first plate responsive to a second control means, and walls defining an elongated substantially V-shaped opening in the second valve plate positioned to move with linear movement of the second plate in the direction of the axis extending through the apex of the V, said plates being positioned so that the opening in one plate is in alignment with the opening in the other plate.

9. In a carburetor, in combination a valve comprising a body, a first control means, a first valve plate mounted on the body for linear movement responsive to said first control means, walls defining a substantially V-shaped opening in the first valve plate positioned to move with linear movement of the plate in the direction of the axis extending through the apex of the V, said walls being beveled to provide a sharp edge on a surface of the plate, a second control means, a second valve plate mounted on the body for linear movement in a direction substantially perpendicular to the movement of the first plate responsive to said second control means, walls defining a substantially V-shaped opening in the second valve plate positioned to move with linear movement of the second plate in the direction of the axis extending through the apex of the V, said walls being beveled to provide a sharp edge on a surface of the plate, and the sides of each of said V's forming an angle of between about 0.1 and 30 degrees, said plates being positioned so that the opening in one plate is in alignment with the opening in the other plate.

10. In a carburetor having a butterfly valve for regulating air movement and a gasoline feed line, in combination a valve on the feed line comprising a body, a first valve plate mounted for linear movement on the body, walls defining a substantially V-shaped opening in the first valve plate positioned to move with linear movement of the plate in the direction of the axis extending through the apex of the V, a linkage for moving the first valve plate on movement of the butterfly valve, a second valve plate mounted on the body for linear movement in a direction substantially perpendicular to the movement of the first plate, means responsive to atmospheric pressure for adjusting the second valve plate, and walls defining a substantially V-shaped opening in the second valve plate positioned to move with linear movement of the second plate in the direction of the axis extending through the apex of the V, said plates being positioned so that the opening in one plate is in alignment with the opening in the other plate.

11. In a carburetor containing an air intake throat and a fuel injection tube, in combination a valve comprising a body, a first control means responsive to an operation adjusting the amount of gasoline to be fed into the carburetor, a first valve plate mounted on the body for linear movement responsive to said first control means, walls defining a substantially V-shaped opening in the first valve plate positioned to move with linear movement of the plate in the direction of the axis extending through the apex of the V, said walls being beveled at an acute angle to a surface to provide a sharp edge on a surface of the plate, a second control means responsive to atmospheric pressure, a second valve plate mounted on the body or linear movement in a direction substantially perpendicular to the movement of the first plate responsive to said second control means, walls defining a substantially V-shaped opening in the second valve plate positioned to move with linear movement of the second plate in the direction of the axis extending through the apex of the V, said walls being beveled at an acute angle to a surface to provide a sharp edge on a surface of the plate, and the sides of each of said V's forming an angle of between about 0.1 and 30 degrees, said plates being positioned so that the opening in one plate is in alignment with the opening in the other plate.

12. The carburetor defined in claim 11, in which the sides of each of said V's form an angle of between about 1.0 and 10.0 degrees.

References Cited in the file of this patent

UNITED STATES PATENTS

| | | |
|---|---|---|
| 1,191,700 | Howes | July 18, 1916 |
| 1,909,304 | Mueller | May 16, 1933 |
| 1,964,663 | Gossler | June 26, 1934 |
| 2,512,744 | Hill | June 27, 1950 |